United States Patent [19]

Asagi et al.

[11] Patent Number: 4,671,397
[45] Date of Patent: Jun. 9, 1987

[54] AUTOMATIC CLUTCH CONTROL SYSTEM

[75] Inventors: Yasuyoshi Asagi, Kawasaki; Noriaki Ogawa, Tokyo; Shigeki Moride, Yokosuka; Toshihiro Hattori, Ayase; Katsuya Shishido, Fujisawa, all of Japan

[73] Assignee: Fujitsu Limited, Kawasaki, Japan

[21] Appl. No.: 674,825

[22] Filed: Nov. 26, 1984

[51] Int. Cl.$^4$ .................... B60K 41/02; B60K 41/28
[52] U.S. Cl. ................... 192/0.052; 192/0.076; 192/0.092; 192/0.096
[58] Field of Search ............... 192/0.052, 0.075, 0.076, 192/0.092, 0.096; 364/184, 186, 187, 424, 431.11, 424.1

[56] References Cited

U.S. PATENT DOCUMENTS

| | | | |
|---|---|---|---|
| 2,983,346 | 5/1961 | Weymann | 192/0.076 |
| 4,366,889 | 1/1983 | Wang | 192/0.092 |
| 4,434,879 | 3/1984 | Lutz et al. | 192/0.052 |
| 4,449,620 | 5/1984 | Sakakiyama | 192/0.052 |
| 4,509,625 | 4/1985 | Tellert | 192/0.052 X |
| 4,527,679 | 7/1985 | Hamada et al. | 192/0.052 X |
| 4,532,594 | 7/1985 | Hosaka et al. | 364/187 X |

FOREIGN PATENT DOCUMENTS 50-12648 5/1975 Japan.
52-5117 1/1977 Japan.

*Primary Examiner*—Rodney H. Bonck
*Attorney, Agent, or Firm*—Staas & Halsey

[57] ABSTRACT

An automatic clutch control system and method for controlling a clutch for an automatic transmission when a clutch stroke sensor fails. The apparatus includes a clutch actuator for controlling a clutch stroke, a plurality of solenoid valves for controlling the clutch actuator, a clutch stroke sensor for measuring the clutch stroke, a control unit for feeding back a stroke signal detected by the clutch stroke sensor when requests for clutch engagement or disengagement are received and for controlling the solenoid valves so as to obtain a clutch moving speed defined by an engine rotational speed and other driving conditions. The control unit further includes a clutch engagement control section and a clutch disengagement control section for controlling solenoid valves for operating the clutch independently of the stroke signal when the stroke sensor fails. The control unit detects a failure of the stroke sensor by defining an upper limit value and a lower limit value for the stroke signal and when the stroke signal exceeds the upper limit value or is lower than the lower limit value it is determined that the stroke sensor has failed. The method includes the steps of setting the upper and lower limit values for the stroke signal, detecting a clutch stroke sensor failure by determining if the value of the stroke signal exceeds the upper limit or is less than the lower limit and operating the clutch at a predetermined speed if a stroke sensor failure is detected.

8 Claims, 6 Drawing Figures

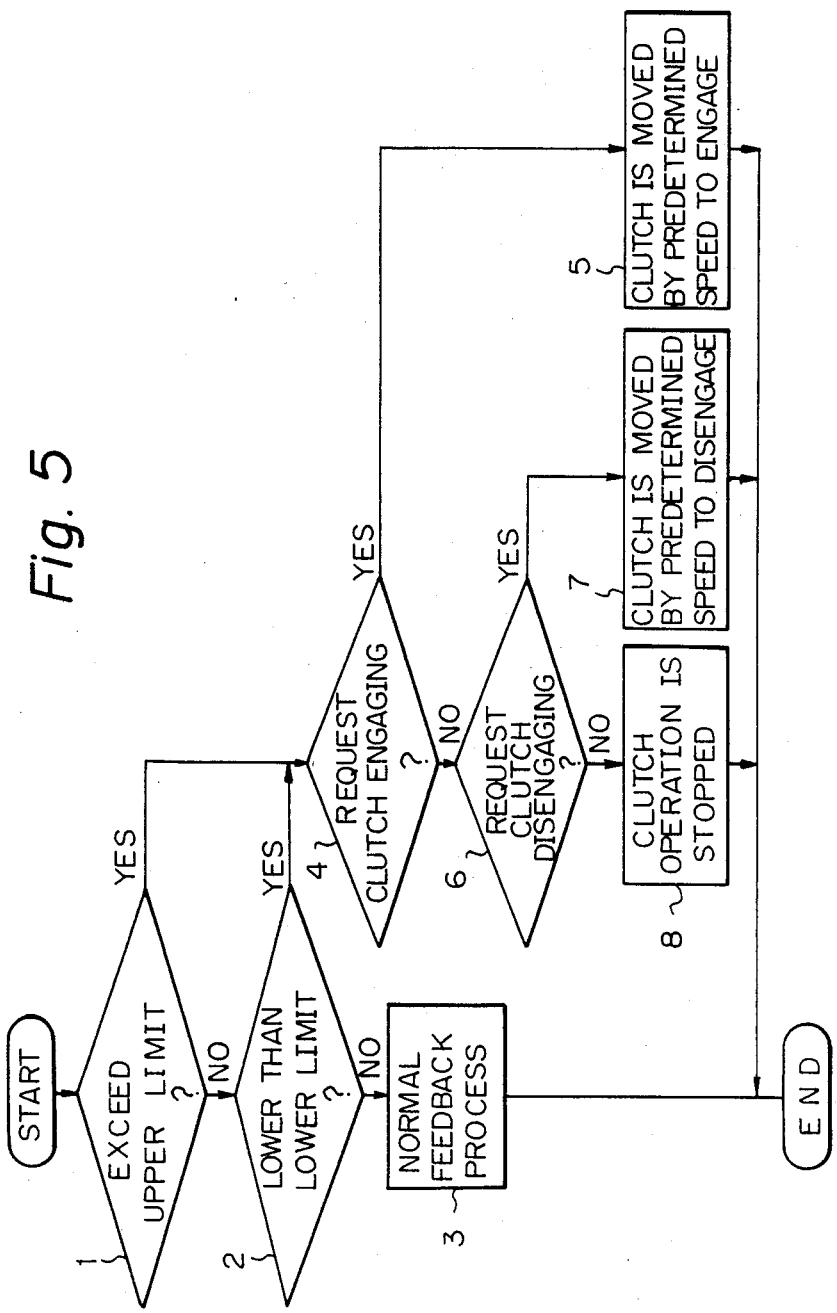

AUTOMATIC CLUTCH CONTROL SYSTEM

BACKGROUND OF THE INVENTION

The present invention relates to an automatic clutch control system for use in automobiles, more particularly to a method and an apparatus, using a microcomputer, which enable an automatic clutch to be controlled when a clutch control sensor is out of order.

The present invention can automatically diagnose the condition of the clutch stroke sensor and, in the event of a breakdown of the clutch stroke sensor, can automatically perform a back-up process for automatic clutch control.

Automatic clutch control systems using microcomputers have already been proposed, such as in Japanese Examined Patent Publication (Kokoku) No. 50-12648 and Japanese Unexamined Patent Publication (Kokai) No. 52-5117. In these systems, a microcomputer is used to control the operation of solenoid valves under a predetermined program stored in the microcomputer, the operation of an actuator is controlled in accordance with the operation of the solenoid valves, and the movement of the clutches (for example, dry-type single-plate clutches), i.e., clutch engagement, clutch slip, and clutch disengagement, is controlled by the actuator through some link mechanism. Japanese Examined Patent Publication No. 50-12648 further discloses a method for gradually changing the clutch engagement condition in proportion to the increment of the engine rotational speed, while Japanese Unexamined Patent Publication No. 52-5117 discloses a method for changing the clutch engagement speed in response to the engine rotational speed.

In these methods, the clutch operation range is determined by the actuator stroke. The actuator stroke, on the other hand, is determined based on a stroke signal detected by the clutch stroke sensor using a potentiometer. Therefore, when the clutch stroke sensor is out of order, the clutch operation can no longer be controlled.

SUMMARY OF THE INVENTION

The primary object of the present invention is to provide an automatic clutch control system, for use in automobiles, using a microcomputer and eliminating the disadvantages in the prior art.

Another object of the present invention is to provide an automatic clutch control system with an automatic back-up process for an out-of-order clutch stroke sensor.

Still another object of the present invention is to provide an automatic clutch control system enabling use of conventional dry-type single-plate clutches and sliding-mesh-type transmissions.

In accordance with the present invention, there is provided an automatic clutch control system including a clutch actuator for controlling a clutch stroke, a plurality of solenoid valves for controlling the clutch actuator, a clutch stroke sensor for measuring the clutch stroke, a control unit for feeding back a stroke signal detected by the clutch stroke sensor when requests for clutch engagement or disengagement are received and for controlling the solenoid valves so as to obtain a clutch moving speed defined by an engine rotational speed and other driving conditions. The control unit includes a clutch engagement control section for controlling the solenoid valves so as to operate toward an engagement direction by a predetermined clutch engagement speed and a clutch disengagement control section for controlling the solenoid valves so as to operate toward a disengagement direction by a predetermined clutch disengagement speed, both the clutch engagement control section and the clutch disengagement control section being activated independently of the stroke signal. The control unit defines an upper limit value and a lower limit value for the stroke signal, and when the stroke signal exceeds the upper limit value or is lower than the lower limit value the control unit controls the solenoid valves by using the clutch engagement control section upon a request for clutch engagement and controls the solenoid valves by using the clutch disengagement control section upon a request for clutch disengagement. The control unit controls the solenoid valves to stop the clutch operation only upon a request for clutch engagement or disengagement.

In accordance with the present invention, it is possible to maintain automobile travel when the clutch stroke sensor is out of order and thus ensure safe driving.

BRIEF DESCRIPTION OF THE DRAWINGS

In the drawings,

FIG. 5 is a flow chart showing the back-up process in the control unit; and

DESCRIPTION OF THE PREFERRED EMBODIMENTS

Before describing the preferred embodiments of the present invention, an explanation will be given of a conventional automatic clutch control system for a semi-automatic transmission using a dry-type single-plate clutch and a hydraulic control actuator.

Figure 1:
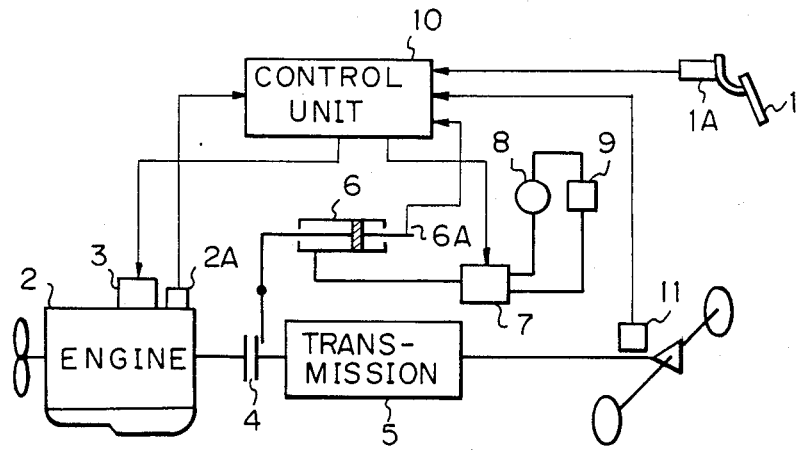
FIG. 1 is a schematic block diagram of a conventional automatic clutch control system.

Referring to FIG. 1, reference numeral 1 is an accelerator pedal, 1A an accelerator pedal sensor, 2 an engine, 2A an engine speed sensor, 3 a throttle actuator, 4 a clutch, 5 a transmission, 6 a clutch actuator, 6A a clutch stroke sensor, 7 a solenoid valve group, 8 an oil pump, 9 an oil tank, 10 a control unit, and 11 an automobile speed sensor.

The control unit 10, constituted by a microcomputer, controls the throttle actuator 3 and the solenoid valve group 7 based on a signal transmitted from the accelerator pedal sensor 1A, a signal transmitted from the engine speed sensor 2A, a signal transmitted from the clutch stroke sensor 6A, and a signal transmitted from the automobile speed sensor 11. The control unit 10 also feeds back the stroke signal transmitted from the clutch stroke sensor 6A to control the opening of the solenoid valve group 7 for engagement, slip, or disengagement of the clutch based on the clutch engagement speed, as defined by the approach of the clutch engagement start point, clutch engagement, clutch slip, clutch disengagement, change in engine rotational speed, automobile speed, and other driving conditions. When the solenoid valve group 7 is controlled, the clutch actuator 6 is activated by its output. Thus, the clutch is engaged, slipped, or disengaged corresponding to the motion of the solenoid valve group 7. As mentioned above, in an automatic clutch control system, the stroke signal transmitted from the clutch stroke sensor 6A is fed back to the control unit 10, whereby the clutch engagement speed and the clutch operation range are controlled by the control unit 10.

In the conventional system, however, when the clutch stroke sensor is out of order, due to breakage or shorting of a wire or poor contact, the clutch operation can no longer be controlled.

An automatic clutch control system according to the present invention will now be explained in detail. As explained above, the automatic clutch control system according to the present invention can be used with conventional dry-type single-plate clutches and sliding-mesh-type transmissions. In the present invention, the change lever used in semiautomatic transmissions is eliminated and a transmission actuator added instead. The clutch and transmission actuator are controlled by a microcomputer controller. Accordingly, the clutch control system according to the present invention is a fully automatic transmission using a conventional clutch and transmission.

Figure 2:
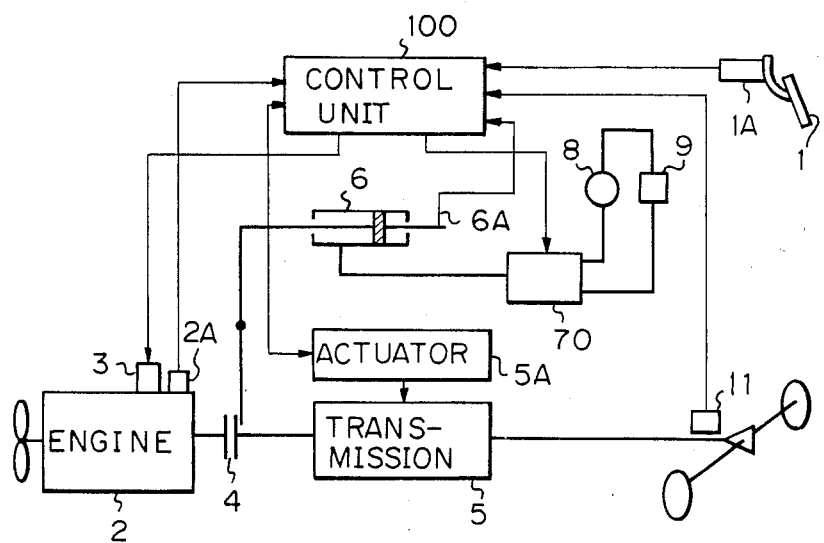
FIG. 2 is a schematic block diagram of an automatic clutch control system according to the present invention.

Referring to FIG. 2, the automatic clutch control system is constituted by the same components as shown in FIG. 1, except for a control unit 100, a solenoid valve group 70, and an actuator 5A. Components which are the same as in FIG. 1 are indicated by the same reference numerals.

Figure 3:
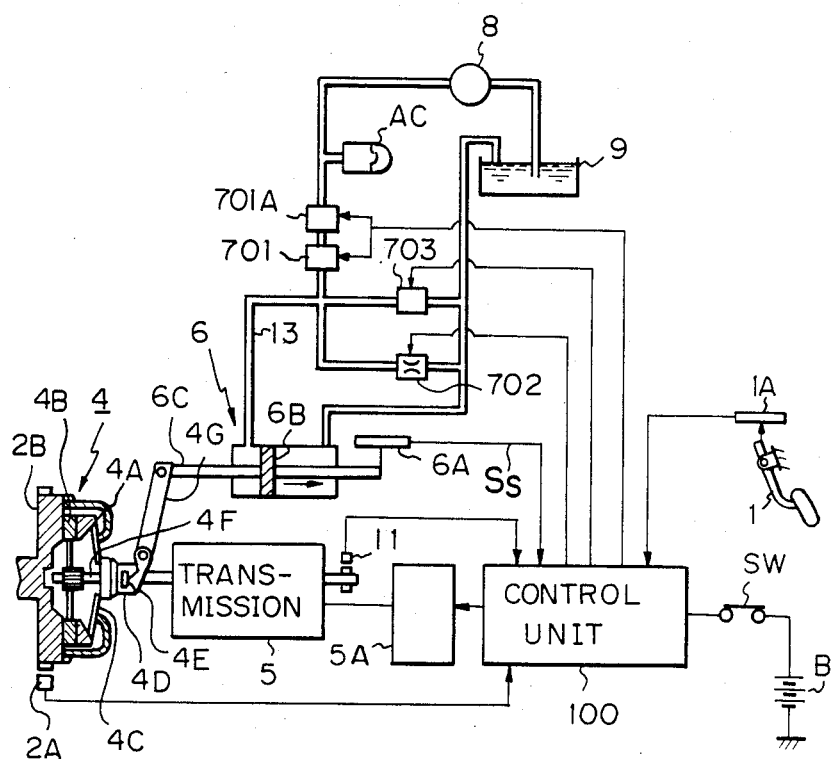
FIG. 3 is a schematic block diagram showing a hydraulic control circuit including the solenoid valves controlled by the control unit shown in FIG. 2.

Referring to FIG. 3, the clutch is constituted by a clutch pressure plate 4A, clutch disk 4B, diaphragm spring 4C, clutch release bearing 4D, clutch release lever 4E, clutch shaft 4F, and lever 4G. Reference numeral 2B is an engine flywheel; 701, 701A, 702, and 703 are solenoid valves in the solenoid valve group 70; B a battery; and SW is a power switch associated with an ignition switch.

The clutch 4 is controlled by controlling the operation of the solenoid valves 701, 701A, 702, and 703 using the control unit 100. The control unit 100 consists of a microcomputer storing a program with respect to driving conditions. When the solenoid valves 701 and 701A, for example, are actuated by the control unit 100, pressurized fluid is supplied to the oil cylinder 6 from the oil pump 8. The piston 6B of the oil cylinder 6 is thus moved toward the right as indicated by the arrow line to disengage the clutch disk 4B. When the solenoid valves 702 and 703 are actuated by the control unit 100, the pressurized fluid is exhausted from the oil cylinder 6. The piston 6B thus moves in the reverse direction due to the action of a return spring (not shown) to disengage the clutch disk 4B.

The resultant data of movement is detected by the clutch stroke sensor 6A, consisting of a potentiometer, and the detected voltage of the potentiometer is fed back as a stroke signal $S_s$ to the control unit 100.

Figure 4:
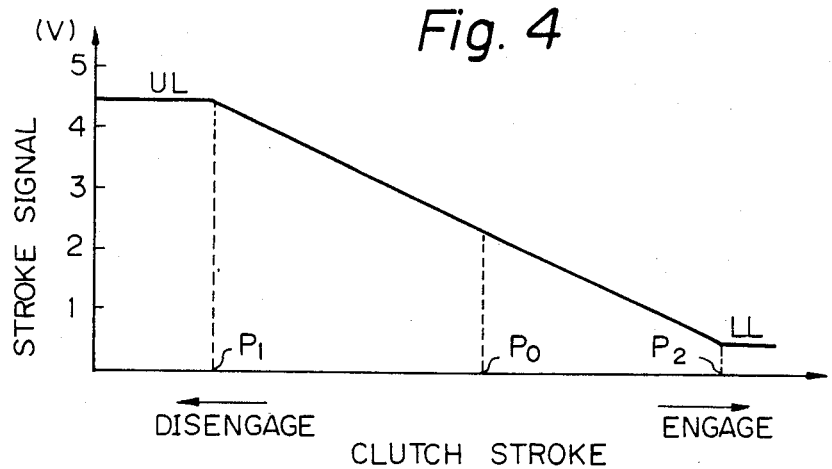
FIG. 4 is a graph showing the relation between a clutch stroke signal and an actuator (clutch) stroke.

Referring to FIG. 4, the ordinate indicates the stroke signal $S_s$ (V) and the abscissa the actuator (clutch) stroke (mm). An upper limit value UL and lower limit value LL are determined for the stroke signal $S_s$ detected by the clutch stroke sensor 6A according to the present invention. On the abscissa, the arrow to the right direction indicates the clutch engagement and the arrow to the left direction indicates the clutch disengagement by the motion of the actuator. The range between point P1 and P2 indicates the effective potentiometer range, in other words, the effective clutch operation range. As can be understood from the graph, the stroke signal voltage is proportional to the actuator (clutch) stroke, i.e., clutch stroke.

According to the present invention, when the stroke signal value exceeds the upper limit value (UL) or is lower than the lower limit value (LL), the control unit 100 diagnoses that the clutch stroke sensor 6A is out of order. When the clutch stroke sensor 6A is diagnosed as being out of order, the control unit 100 controls the actuator 6 based on the predetermined program. Therefore, the clutch is controlled by a predetermined clutch moving speed to direct clutch engagement or clutch disengagement based on requests of clutch engagement or disengagement transmitted from the accelerator pedal sensor 1A, the engine speed sensor 2A, and the automobile speed sensor 11 to the control unit 100.

FIG. 5 is a flow chart for explaining a back-up process in the control unit 100 when the clutch stroke sensor 6A is out of order.

At step 1, the control unit 100 checks whether the stroke signal value exceeds the upper limit value (UL). If it does not, at step 2, the control unit 100 checks whether the stroke signal value is lower than the lower limit value (LL). If it does not, the control unit 100 performs normal automatic clutch control by using a feedback process as mentioned above. Therefore, steps 1 to 3 are for checking out-of-order sensors.

At step 4, when the stroke signal value exceeds the upper limit value (UL), i.e., in the case of "YES" at step 1, or when the stroke signal value is lower than the lower limit value (LL), i.e., in the case of "YES" at step 2, the control unit 100 checks whether there is a request for clutch engagement from various sensors 1A, 2A, and 11. If yes, at step 5, the control unit 100 controls the clutch operation to direct clutch engagement by the predetermined clutch moving speed through the solenoid valve group 70 controlled by the predetermined back-up process program. This control is independent of the clutch stroke signal because the clutch stroke sensor 6A is out of order. In the case of "NO" at step 4, at step 6, the control unit 100 checks whether there is a request for clutch disengagement from various sensors 1A, 2A, and 11. If "YES", at step 7, the control unit 100 controls the clutch operation to direct clutch disengagement by the predetermined clutch moving speed through the solenoid valve group 70 controlled by the predetermined back-up process program. As with step 6, this control is independent of the clutch stroke signal. In the case of "NO", at step 8, the clutch operation is stopped and the solenoid valves are not controlled.

Figure 6:
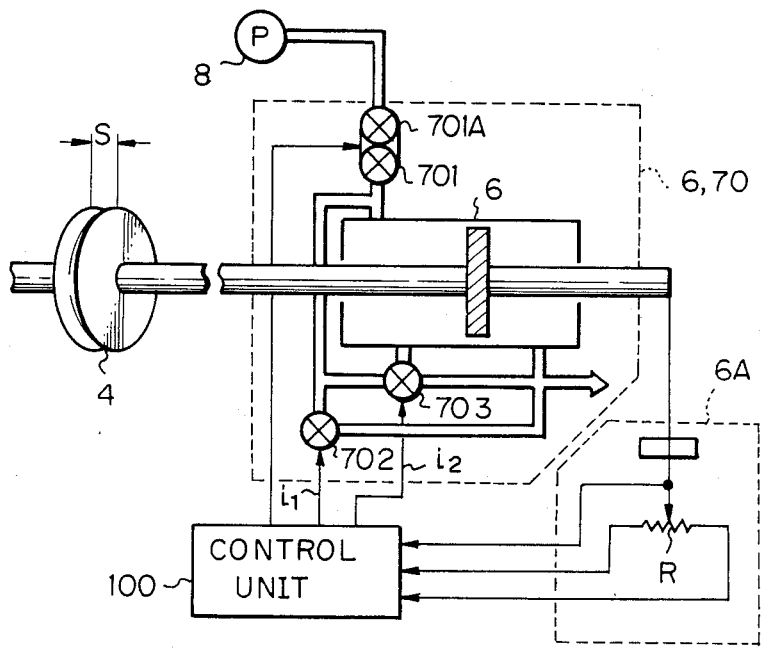
FIG. 6 is a schematic block diagram showing the automatic clutch control system and the clutch stroke sensor.

FIG. 6 shows the detailed structure of the clutch stroke sensor 6A shown in FIG. 2 and FIG. 3. As can be seen from the drawing, the clutch stroke sensor is a potentiometer. Depending on the motion of the actuator piston rod, different voltages are obtained from the output across the resistance R as the stroke signal $S_s$.

We claim:
1. An automatic clutch control system, comprising:
   a clutch actuator for controlling a clutch stroke;
   a plurality of solenoid valves for controlling said clutch actuator;
   a clutch stroke sensor for measuring said clutch stroke; and control means, for feeding back a stroke signal detected by said clutch stroke sensor in response to requests for clutch engagement or disengagement, and for controlling said solenoid valves so as to obtain a clutch moving speed defined by an engine rotational speed and other driving conditions, including a clutch engagement control section for controlling said solenoid valves so as to operate toward an engagement direction at a predetermined clutch engagement speed, and a clutch disengagement control section for controlling said solenoid valves so as to operate toward a disengagement direction at a predetermined clutch disengagement speed, both the clutch engagement control section and the clutch disengagement control section being activated independently of said stroke signal, wherein said control means:

defines an upper limit value and a lower limit value for said stroke signal;

diagnoses a clutch stroke sensor failure when said stroke signal exceeds said upper limit value or is lower than said lower limit value; and controls said solenoid valves to performs the clutch operation by controlling said solenoid valves in accordance with a predetermined control program upon a request for clutch engagement or disengagement when a clutch stroke sensor failure is diagnosed.

2. A method for controlling a clutch stroke through a clutch actuator in an automatic transmission system for automobiles when a clutch stroke sensor fails, comprising the steps of:

(a) detecting an accelerator position with an accelerator position sensor, an engine rotational speed with an engine speed sensor, a clutch stroke with the clutch stroke sensor provided on the clutch actuator and a transmission gear position with a transmission gear position sensor;

(b) comparing each sensor data with predetermined stored data and obtaining an upper limit value and a lower limit value of a stroke signal;

(c) diagnosing a failure condition of a clutch stroke sensor through said stroke signal when said stroke signal exceeds said upper limit value or is lower than said lower limit value; and (d) controlling said clutch stroke with a predetermined control program when a failure condition of the clutch stroke sensor is diagnosed.

3. A method as claimed in claim 2, wherein step (d) is performed by said predetermined control program independent of said clutch stroke signal.

4. A method as claimed in claim 2, wherein step (d) is performed by engaging said clutch at a predetermined clutch engagement speed upon a request for clutch engagement.

5. A method as claimed in claim 2, wherein step (d) is performed by disengaging said clutch at a predetermined clutch disengagement speed upon a request for clutch disengagement.

6. An apparatus for controlling a clutch stroke through a clutch actuator in an automatic transmission system for automobiles, comprising:

means for detecting data relating to an accelerator position, an engine rotational speed, a clutch stroke and a transmission gear position;

means for comparing each detected data with predetermined stored data and obtaining an upper limit value and a lower limit value of the data for a clutch stroke data signal;

means for diagnosing a clutch stroke sensor failure in accordance with said clutch stroke data signal based on whether said stroke signal exceeds said upper limit value or is lower than said lower limit value; and means for controlling said clutch stroke by a predetermined control program when said diagnosing means diagnoses a clutch stroke sensor failure.

7. An apparatus as claimed in claim 6, wherein the comparing, diagnosing and controlling means are constituted by said microcomputer.

8. A method of detecting a clutch stroke sensor failure and controlling a clutch stroke of a clutch for an automatic transmission when the clutch stroke sensor fails, comprising the steps of:

(a) setting an upper limit and a lower limit for a stroke signal output by the clutch stroke sensor;

(b) detecting a clutch stroke sensor failure by determining if the value of the stroke signal exceeds the upper limit and by determining if the value of the stroke signal is less than the lower limit; and (c) operating the clutch at a predetermined speed of engagement or disengagement if a clutch stroke sensor failure is detected in step (b).

* * * * *

UNITED STATES PATENT AND TRADEMARK OFFICE
CERTIFICATE OF CORRECTION

PATENT NO. : 4,671,397

DATED : June 9, 1987

INVENTOR(S) : Yasuyoshi Asagi, Noriaki Ogawa, Shigeki Moride, Toshihiro Hattori and Katsuya Shishido It is certified that error appears in the above-identified patent and that said Letters Patent is hereby corrected as shown below:

Title page:

Change the name of the assignee [73] as follows:

"Fujitsu Limited" s/b "Fujitsu Limited and Isuzu Motors Limited".

Signed and Sealed this

Nineteenth Day of April, 1988

Attest:

DONALD J. QUIGG

*Attesting Officer*     *Commissioner of Patents and Trademarks*